Figure 1:
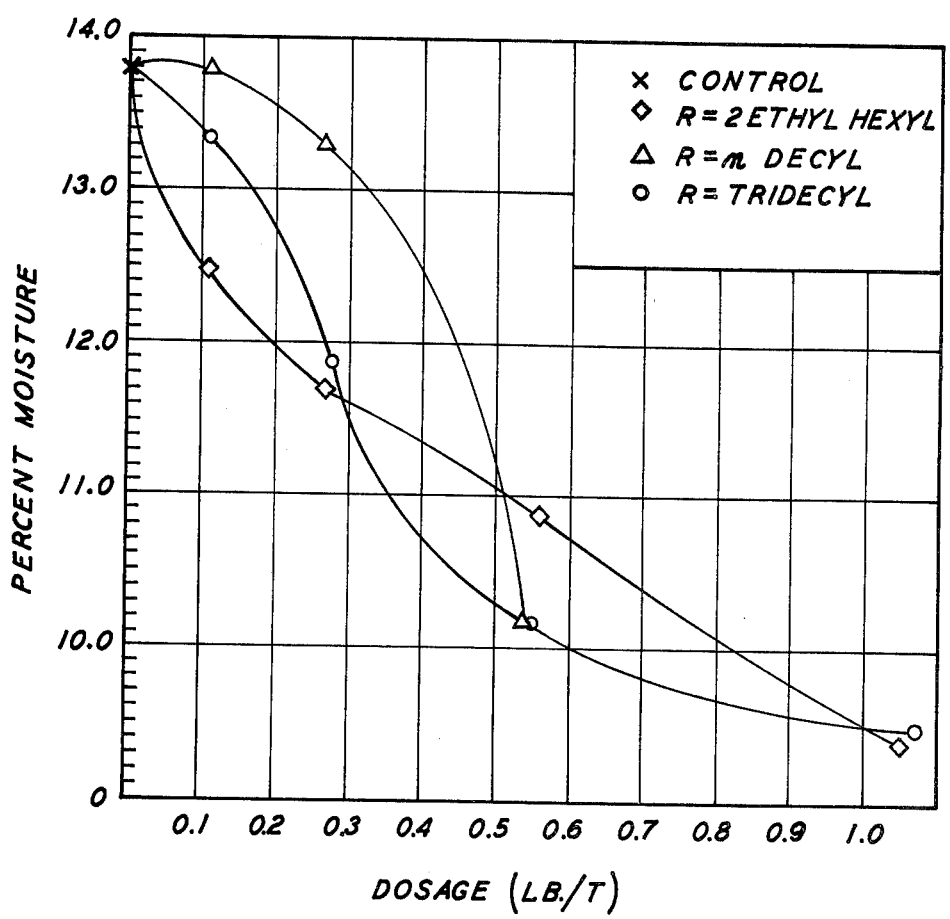

United States Patent [19] [11] 4,153,549
Wang et al. [45] May 8, 1979

[54] SODIUM DIALKYL SULFOSUCCINATES AS DEWATERING AIDS IN THE FILTRATION OF MINERAL CONCENTRATES

[75] Inventors: Samuel S. Wang, Cheshire; Morris E. Lewellyn, Stamford, both of Conn.

[73] Assignee: American Cyanamid Company, Stamford, Conn.

[21] Appl. No.: 817,409

[22] Filed: Jul. 20, 1977

[51] Int. Cl.$^2$ ............................................. B01D 5/00
[52] U.S. Cl. ..................................... 210/54; 252/194
[58] Field of Search ............ 252/194, 436; 210/54 A, 210/54 R; 34/9, 95

[56] References Cited

U.S. PATENT DOCUMENTS

| | | | |
|---|---|---|---|
| 3,259,570 | 7/1966 | Priesing et al. | 210/53 |
| 3,300,407 | 1/1967 | Priesing et al. | 210/53 |
| 3,577,348 | 5/1971 | Clementson | 252/355 X |
| 3,755,280 | 8/1973 | Saunders et al. | 210/54 |

Primary Examiner—Benjamin R. Padgett
Assistant Examiner—J. L. Barr
Attorney, Agent, or Firm—William J. van Loo

[57] ABSTRACT

The use of a dialkylsulfosuccinic acid or salt thereof as a dewatering aid in the filtration of mineral concentrates provides reduced moisture content and substantial retention of the dewatering aid on the dewatered mineral concentrate when the alkyl groups of the dewatering aid contain 10 to 24 carbon atoms.

4 Claims, 2 Drawing Figures

SODIUM DIALKYL SULFOSUCCINATES AS DEWATERING AIDS IN THE FILTRATION OF MINERAL CONCENTRATES

This invention relates to an improved process for dewatering a mineral concentrate. More particularly, this invention relates to such a process wherein a dialkylsulfosuccinic acid and alkali metal and ammonium salts thereof are used as dewatering aid.

Ores of various minerals are concentrated by various procedures to provide mineral concentrates that are further processed to valuable materials. One of the most widely used methods of concentraton of minerals is that of froth flotation which is applicable to a wide variety of ores including sulfide and non-sulfide varieties. In many instances a series of flotations are performed whereby increasingly cleaner concentrates result. After a concentrate has been sufficiently enriched in mineral values, it may be subjected to further processing such as drying and smelting, which processing may be performed at another location. To subject the concentrate to further processing, it is generally dewatered by filtration or equivalent process, such as centrifugation to remove water therefrom. The removal of water from the concentrate decreases the costs of shipping when it is processed at a new location. The removal of water also reduces the requirements for energy consumption when drying is effected.

The commercial procedure for dewatering mineral concentrates generally involved filtration of the aqueous slurry of mineral values arising from concentrating the ore by flotation or other concentration process. The residual water content of the dewatered mineral concentrate will vary widely depending upon the mineral composition, the procedure of dewatering employed, the absence or presence of dewatering aid, and the like.

Certain dewatering aids have been used in the prior processes for dewatering. In some instances, the dewatering aid was not completely acceptable because it did not reduce the moisture content of the dewatered mineral concentrate adequately. In other instances, the dewatering aid was not substantially adsorbed on the dewatered mineral concentrate and contaminated the process water, which water is recycled to the mining processes including that of ore concentration from where the mineral concentrates to be dewatered arise. Contamination of the recycled process water adversely affects ore concentration and other processes associated with mining operations.

Thus, there exists the need for improved dewatering processes for mineral concentrates which not only provide low moisture contents in the dewatered mineral concentrates but which also provide dewatering aids that are substantially adsorbed on the dewatered mineral concentrates so as to minimize adverse effects on other mining processes that employ the recycled process water. Such a provision would satisfy a long-felt need and constitute a notable advance in the art.

In accordance with the present invention, there is provided a process for reducing the moisture content of mineral concentrates which comprises mixing with an aqueous slurry of said mineral concentrate an effective amount of a dialkyl sulfosuccinic acid or salt thereof of the formula

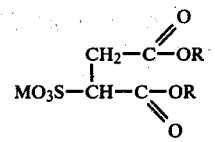

wherein M is a hydrogen, alkali metal, or ammonium cation and R is an alkyl group of about 10 to 24 carbon atoms, and thereafter dewatering the thus-treated slurry.

The dewatering process of the present invention desirably reduces the moisture content of the mineral concentrate being dewatered and retains the dewatering aid substantially on the dewatered mineral concentrate so as to minimize adverse effects on other mining processes using recycled water from the dewatering process.

Figure 2:
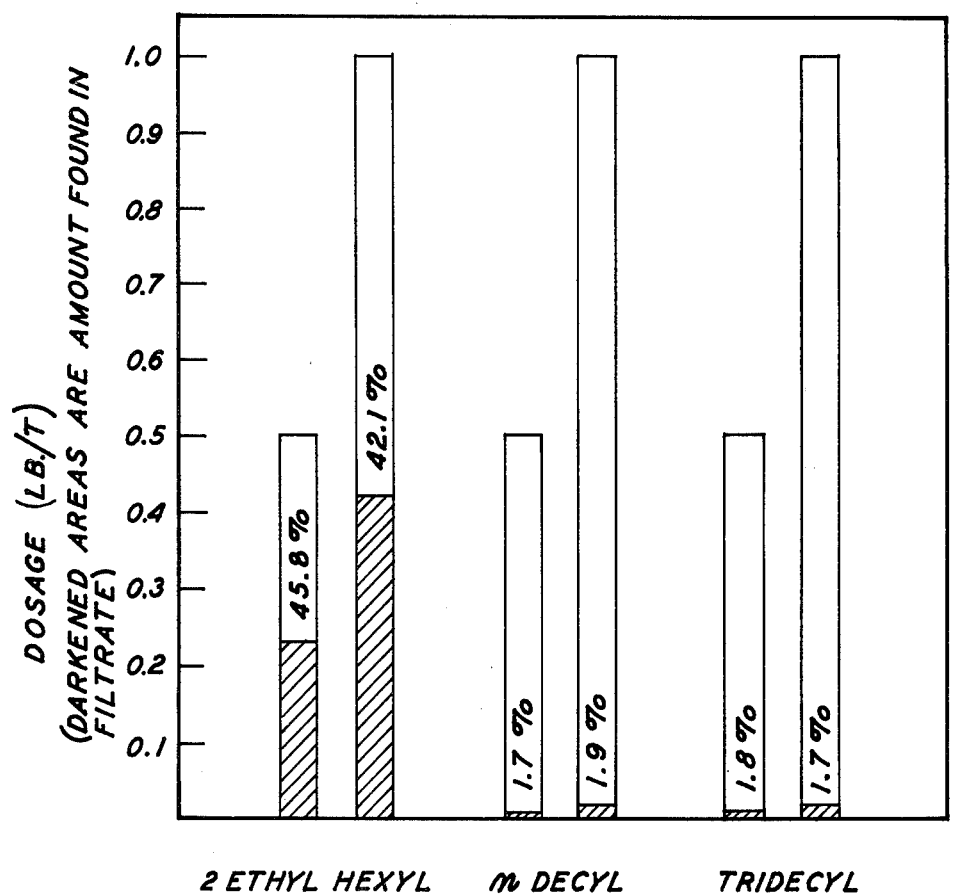

The process of the present invention is described with particular reference to the accompanying drawings wherein:

FIG. 1 is a plot of residual moisture content of a mineral concentrate against dosage of certain dewatering aids, and FIG. 2 is a bar-graph showing the retention of dewatering aid on the dewatered mineral concentrate.

In carrying out the process of the present invention, one can use effectively any mineral concentrate that is conventionally subjected to dewatering for further processing. Preferably such mineral concentrates are those obtained from concentration using an aqueous slurry of finely ground ores. The ores may be of the sulfide and non-sulfide types. Particularly effective mineral concentrates include metal concentrates of copper, lead and iron ores as well as coal concentrates.

To effect reduction of the moisture content of the selected mineral concentrate, there is mixed with an aqueous slurry of the mineral concentrate an effective amount of a dialkyl sulfosuccinic acid or salt thereof of the structure:

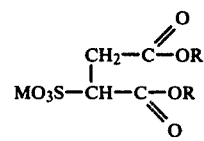

wherein M is a hydrogen, alkali metal, or ammonium cation and R is an alkyl group of 10 to 24 carbon atoms. Preferred species include those containing about 10 to 16 carbon atoms in the alkyl group and in the sodium salt form.

In addition to the dialkyl sulfosuccinic acid or salt thereof, the dewatering aid may contain one or more solvents to facilitate handling of the composition. Suitable solvents include water; alcohols, such as methanol, ethanol, isopropanol; glycols, such as diethylene glycol, triethylene glycol, and the like; glycol ethers, such as the monomethyl ether of ethylene glycol and the like; and mixtures thereof. It is generally preferred to use a composition containing about 0 to 70 weight percent of solvent, which may be diluted further for treatment.

An effective amount of dialkyl sulfosuccinic acid or salt thereof is that amount which provides a desirable reduction in moisture content of the mineral concentrate and which is substantially retained on the dewatered mineral concentrate. The effective amount will vary widely, depending upon the mineral concentrate being dewatered, the specific dialkyl sulfosuccinic acid or salt thereof being used as dewatering aid, the extent to which dewatering is desired, and the like. Effective amounts are generally found in the range of about 0.05 to about 5 pounds per ton of mineral concentrate being dewatered. Preferred amounts are generally in the range of about 0.1 to about 2 pounds per ton of mineral concentrate.

After the dialkyl sulfosuccininc acid or salt thereof is mixed with the slurry of mineral concentrate, the mineral concentrate is dewatered following conventional procedures. Generally the treated slurry is subjected to filtration using typical filtration devices. Vacuum or pressure filtration devices are suitable as are centrifuges.

Use of the selected dialkyl sulfosuccinic acids or salts thereof defined in the process of the present invention will provide desirably low moisture contents in the dewatered mineral concentrates and will avoid contamination of the process water.

The invention is more fully illustrated in the examples which follow wherein all parts and percentages are by weight unless otherwise specified.

COMPARATIVE EXAMPLES A-E

Using an aqueous slurry of a copper concentrate in the form of chalcopyrite ($CuFeS_2$) at a concentration of about 50% chalcopyrite ($CuFeS_2$), the sodium salt of di(2-ethylhexyl) sulfosuccinate (70% solution in ethanol/water diluted to 1% in water) was added at various dosage levels and performance was evaluated relative to a control employing no additive as to residual moisture content of the dewatered mineral concentrate, filtration being by pressure filtration at 20 p.s.i. The amount of dewatering aid found in the filtrate was also determined and the retention of dewatering aid on the dewatered mineral concentrate was determined by difference.

Results and dosage levels are given in Table 1 and in FIGS. 1 and 2.

EXAMPLES 1 – 3

The procedure of Comparative Examples A–E was repeated except that the dewatering aid was the sodium salt of di(n-decyl)sulfosuccinic acid.

Results and dosage levels are given in Table 1 and in FIGS. 1 and 2.

EXAMPLES 4 – 7

The procedure of Comparative Examples A–E was again repeated except that the dewatering aid was the sodium salt of di(tridecyl)sulfosuccinic acid.

Results and dosage levels are representing different dialkylsulfosuccinates against dosage of dialkylsulfosuccinate. The curves show that while the 2-ethylhexyl derivative is more effective at low dosage, the other derivatives are more effective at higher dosages.

In FIG. 2, the retention data is shown as bar graphs wherein it is clear that the higher dialkylsulfosuccinates are retained in more substantial amounts than is the di(2-ethylhexyl)sulfosuccinate given in Table 1 and FIGS. 1 and 2.

TABLE I

DEWATERING OF COPPER CONCENTRATE

| Ex. | Sulfosuccinate Dewatering Aid | Dosage Lb/Ton | Residual Moisture (%) | Retention On Concentrate (%) |
|---|---|---|---|---|
| A | Control (none) | — | 13.8 | — |
| B | sodium di(2-ethylhexyl) | .077 | 12.5 | not determined |
| C | sodium di(2-ethylhexyl) | .189 | 11.7 | not determined |
| D | sodium di(2-ethylhexyl) | .392 | 10.9 | 54 |
| E | sodium di(2-ethylhexyl) | .735 | 9.4 | 58 |
| 1 | sodium di(n-decyl) | .077 | 13.8 | not determined |
| 2 | sodium di(n-decyl) | .189 | 13.3 | not determined |
| 3 | sodium di(n-decyl) | .378 | 10.2 | 98 |
| 4 | sodium di(tridecyl) | .077 | 13.6 | not determined |
| 5 | sodium di(tridecyl) | .196 | 11.9 | not determined |
| 6 | sodium di(tridecyl) | .385 | 10.2 | 98 |
| 7 | sodium di(tridecyl) | .749 | 9.5 | 98 |

The results show that while the sodium di(2-ethylhexyl)sulfosuccinate provides desirably low moisture contents, it is not substantially retained on the dewatered concentrate. On the other hand, sodium dialkyl sulfosuccinates having 10 or more carbon atoms in the alkyl groups show desirable low moisture contents while being substantially retained on the dewatered mineral concentrate.

In FIG. 1, the data on moisture content is plotted in separate curves.

We claim:

1. A process for reducing the moisture content of mineral concentrates subject to dewatering which comprises mixing with an aqueous slurry of said mineral concentrate an effective amount of a dialkylsulfosuccinic acid or salt thereof of the formula:

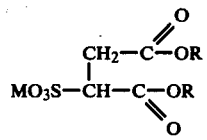

wherein M is a hydrogen, alkali metal, or ammonium cation and R is an alkyl group of about 10 to 24 carbon atoms, dewatering the thus-treated slurry, and substantially retaining upon said dewatered mineral concentrate said dialkylsulfosuccinic acid or salt.

2. The process of claim 1 wherein the mineral concentrate is a copper concentrate.

3. The process of claim 1 wherein said dialkyl sulfosuccinic salt is sodium di(n-decyl)sulfosuccinate.

4. The process of claim 1 wherein said dialkyl sulfosuccinate salt is sodium di(tridecyl)sulfosuccinate.

* * * * *